No. 832,478. PATENTED OCT. 2, 1906.
G. W. HART.
MILK STRAINER.
APPLICATION FILED DEC. 22, 1905.

Witnesses
F. J. Veihmeyer
E. S. Elliott

Inventor
George W. Hart.
By Edson Bros,
Attorneys

UNITED STATES PATENT OFFICE.

GEORGE W. HART, OF ROSEDALE, KANSAS.

MILK-STRAINER.

No. 832,478.  Specification of Letters Patent.  Patented Oct. 2, 1906.

Application filed December 22, 1905. Serial No. 292,979.

*To all whom it may concern:*

Be it known that I, GEORGE W. HART, a citizen of the United States, residing at Rosedale, in the county of Wyandotte and State of Kansas, have invented certain new and useful Improvements in Milk-Strainers; and I do hereby declare the following to be a full, clear, and exact description of the invention, such as will enable others skilled in the art to which it appertains to make and use the same.

My invention relates to improvements in milk-strainers.

It has for its object to provide a device of this nature which is simple in construction, cheap of manufacture, efficient, and sanitary.

The invention consists in the features of construction and combinations of parts hereinafter described, and more particularly pointed out in the claims concluding this specification.

Figures 1, 2:
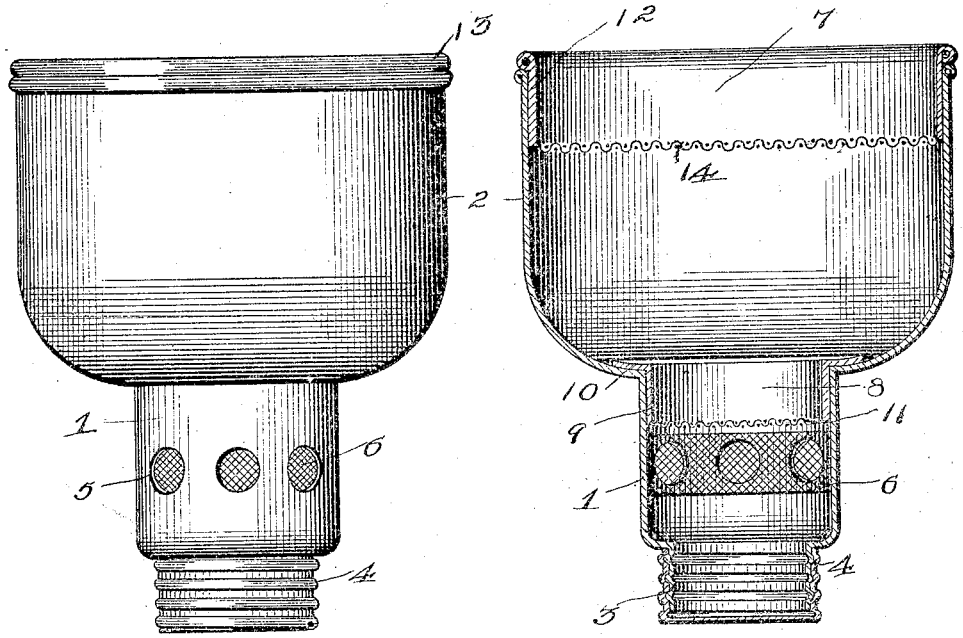
Figure 3:
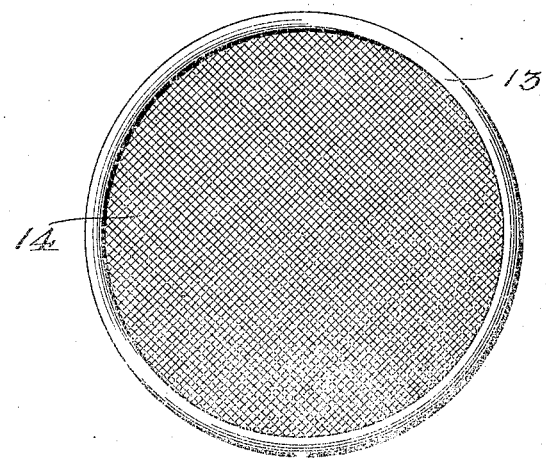

In the accompanying drawings, illustrating the preferred embodiment of my invention, Figure 1 is an elevation of my invention. Fig. 2 is a central vertical sectional view thereof, and Fig. 3 is a plan view of the device.

While the preferred embodiment of my invention is illustrated in the accompanying drawings and its construction and operation are described in this specification, the right is reserved to make such changes from the construction shown and described herein as the scope of the claims hereto appended will permit.

Referring more particularly to the drawings, the body or casing of the strainer comprises a tubular lower portion 1 and a flared cap-shaped portion 2, preferably made integral with said lower portion. The lower end of the tubular portion 1 is formed with the screw-threads 3 to receive a correspondingly screw-threaded cap 4. Openings 5 are provided in the walls of said tubular portion, said openings being covered with straining material 6, secured to the inner surface of said tubular portion. The casing is fitted with two removable strainers, an upper one 7, fitting in the upper end of the portion 2, and a lower and smaller one 8, fitting into the upper end of the tubular portion at its juncture with the flared portion 2. Said lower strainer is tray-like in form, with a vertical side wall 9, having a beveled flange 10 at its upper edge to engage the shoulder at the juncture between the two portions of the casing and support the strainer in place. The bottom of the strainer is formed of straining material 11. The upper strainer is made substantially like the lower one, with a vertical wall 12, flange 13, and bottom of straining material 14.

The milk or other fluid placed in the upper strainer will pass through it, the upper cap-shaped portion of the casing to the lower strainer, through said lower strainer into the lower tubular portion of the casing, and out through the openings 5 in the walls of said tubular portion after having been strained three times. The relative size of the meshes of the several strainers may be regulated to suit requirements. The cap 4 is adapted to receive the settlings or dirt and may be detached for the purpose of cleaning. As both of the tray-strainers are also removable, all parts of the device may be readily cleaned.

Having thus described my invention, what I claim as new, and desire to secure by Letters Patent, is—

1. A device of the character described, comprising a casing having a lower tubular portion and an upper cup-shaped portion, said tubular portion provided with openings in its side walls covered with straining material and having its lower end closed, and a removable strainer comprising a vertical wall portion fitting into the tubular portion of the casing and having straining material at its lower end and a flange at its upper end engaging the shoulder at the juncture of the upper and lower portions of the casing.

2. A device of the character described, comprising a casing having a lower tubular portion and an upper cup-shaped portion, said tubular portion provided with openings in its side walls covered with straining material, said tubular portion also provided with an extended integral threaded portion, a removable cap engaging said threaded portion, a removable strainer comprising a vertical wall portion fitting into the tubular portion of the casing and having straining material at its lower end and a flange at its upper end engaging the shoulder at the juncture of the upper and lower portions of the casing, and a strainer arranged at the upper end of the cup-shaped portion.

In testimony whereof I affix my signature in presence of two witnesses.

GEORGE W. HART.

Witnesses:
J. G. PERRY,
F. B. McCALL.